United States Patent
Yamada et al.

(12)

(10) Patent No.: US 6,301,365 B1
(45) Date of Patent: Oct. 9, 2001

(54) AUDIO SIGNAL MIXER FOR LONG MIX EDITING

(75) Inventors: Yoichi Yamada; Takeaki Funada; Gen Inoshita, all of Tokorozawa (JP)

(73) Assignee: Pioneer Electronic Corporation, Tokyo (JP)

( * ) Notice: Subject to any disclaimer, the term of this patent is extended or adjusted under 35 U.S.C. 154(b) by 873 days.

(21) Appl. No.: 08/561,808

(22) Filed: Nov. 22, 1995

(30) Foreign Application Priority Data

Jan. 20, 1995 (JP) .................................................. P7-007653

(51) Int. Cl.[7] ................................ H04B 1/00; H03G 3/00
(52) U.S. Cl. ............................................. 381/119; 381/107
(58) Field of Search ..................................... 381/119, 123, 381/102, 103, 104, 106, 109, 107; 333/14, 28 R, 625; 84/660

(56) References Cited

U.S. PATENT DOCUMENTS

| | | | |
|---|---|---|---|
| 4,631,525 | * 12/1986 | Serravalle, Jr. ........................ | 381/109 |
| 4,682,364 | * 7/1987 | Dünnebacke .......................... | 381/104 |
| 4,947,440 | * 8/1990 | Bateman et al. ....................... | 381/119 |
| 5,054,077 | * 10/1991 | Suzuki .................................. | 381/119 |
| 5,060,272 | * 10/1991 | Suzuki .................................. | 381/107 |
| 5,102,373 | * 4/1992 | Martinson et al. .................... | 474/101 |
| 5,177,801 | * 1/1993 | Shoda et al. .......................... | 381/104 |
| 5,233,666 | * 8/1993 | Deveau ................................. | 381/119 |
| 5,239,458 | * 8/1993 | Suzuki .................................. | 381/119 |
| 5,317,641 | * 5/1994 | Yasuda et al. ........................ | 381/119 |

\* cited by examiner

Primary Examiner—Xu Mei
(74) Attorney, Agent, or Firm—Sughrue, Mion, Zinn, Macpeak & Seas, PLLC

(57) ABSTRACT

An audio signal mixer capable of performing a long mix editing with simple manipulations. A second audio signal producing means is prevented from producing a second audio signal when an operating member is positioned at a first end, while a first audio signal producing means is prevented from producing a first audio signal when the operating member is positioned at a second end. As the operating member is moved away from the first end or the second end, the first and second audio signals are mixed. As the operating member is moved toward the second end, the level of the first audio signal is gradually decreased while the level of the second audio signal is gradually increased. Conversely, as the operating member is moved toward the first end, the level of the second audio signal is gradually decreased while the level of the first audio signal is gradually increased. Thus, only by manipulating the operating member, it is possible to control two audio signal producing means such as CD players to reproduce or stop as well as to control a cross-fade operation for audio signals reproduced therefrom.

4 Claims, 4 Drawing Sheets

AUDIO SIGNAL MIXER FOR LONG MIX EDITING

BACKGROUND OF THE INVENTION

1. Field of the Invention

The present invention relates to an audio signal mixer for performing cross-fade on two audio signals and mixing these signals.

2. Description of Background Information

Music generally played in discotheques is so-called dance music which is suitable for dancing. However, even with such dance music, it is not preferable to change the tempo every time a different piece of music is played because people may find it difficult to dance to the accompaniment of such tempo-changing music. On the other hand, continuously replaying the same music for a long time, by reason of not changing the tempo, causes people to lose their interest in dancing. Thus, a disk jockey dedicated to edit pieces of dance music in a discotheque is provided with a plurality of (for example, two) disk players in order to replay a next piece of music (second piece) immediately after the completion of a currently replayed piece of music (first piece) through a mixer for editing. In this event, while the first piece is being replayed by one player, the head of the next piece (second piece) is searched for in the other player and the disk rotating speed of the other player is controlled such that replay of the second piece can be started at the time replay of the first piece has been completed.

As an editing method employed for editing the transition from a first piece of music to a second piece of music, a cut-in editing, a long mix editing, and so on are performed depending on the taste of individual disk jockeys. Among these mixing techniques, the long mix editing is such an editing that mixes the first piece with the second piece using a mixer for cross-fading the first and second pieces. However, the long mix editing requires a disk jockey to perform complicated operations on two disk players and on a mixer. Specifically, the disk jockey, after searching for the head of a second piece, maintains the second piece ready for starting the replay at any time, and when an editing point of the first piece has reached to start cross-fade, the disk jockey must start the replay of the second piece while performing a cross-fade adjustment.

OBJECT AND SUMMARY OF THE INVENTION

It is therefore an object of the present invention to provide an audio signal mixer which is capable of achieving the long mix editing with simple manipulations.

The audio signal mixer according to the present invention is characterized by first audio signal producing apparatus for producing a first audio signal, second audio signal producing apparatus for producing a second audio signal, a single operating member movable between a first end and a second end, level adjusting means for progressively decreasing the level of the first audio signal as the operating member is positioned closer to the second end and for progressively decreasing the level of the second audio signal as the operating member is positioned closer to the first end, means for adding the first and second audio signals which have their levels adjusted by the level adjusting means, means for detecting the position of the operating member, and control means for stopping a producing operation of the second audio signal by the second audio signal producing means when the operating member is positioned at the first end and for stopping the producing operation of the first audio signal by the first audio signal producing means when the operating member is positioned at the second end.

According to the present invention, the second audio signal producing means is prevented from producing a second audio signal when the operating member is positioned at the first end. When the operating member is moved away from the first end, the second audio signal is produced and mixed with a first audio signal. As the operating member is moved toward the second end, the level of the first audio signal is gradually decreased, while the level of the second audio signal is gradually increased. When the operating member has reached the second end, the first audio signal generating means is prevented from producing the first audio signal. Conversely, when the operating member is moved away from the second end, the first audio signal is produced and mixed with the second audio signal. As the operating member is moved toward the first end, the level of the second audio signal is gradually decreased, while the level of the first audio signal is gradually increased. When the operating member has reached the first end, the second audio signal producing means is prevented from producing the second audio signal.

DESCRIPTION OF THE PREFERRED EMBODIMENTS

An embodiment of the present invention will hereinafter be described in detail with reference to the accompanying drawings.

Figure 1:
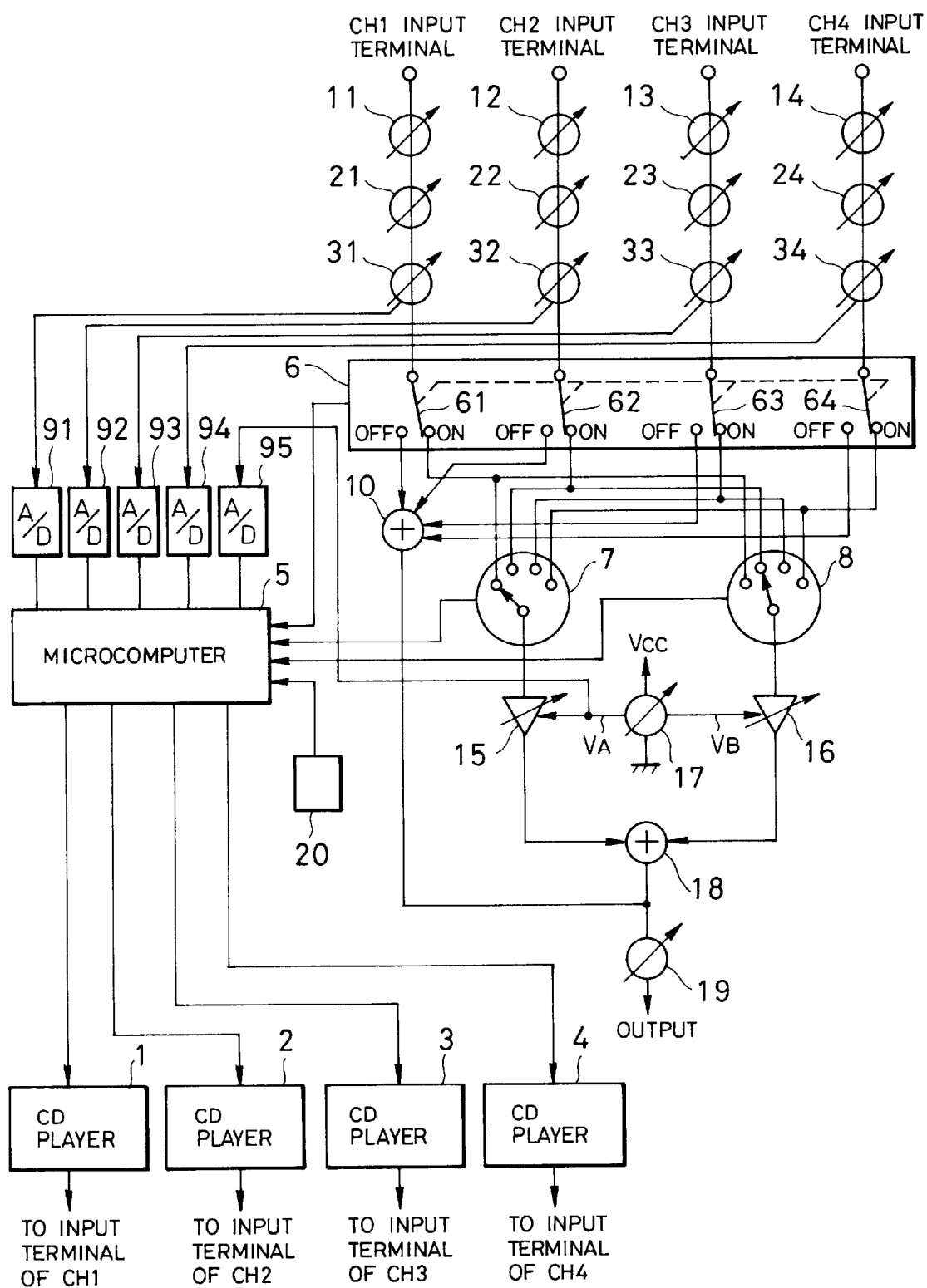
FIG. 1 is a diagram showing an embodiment of the present invention.
Figure 2:
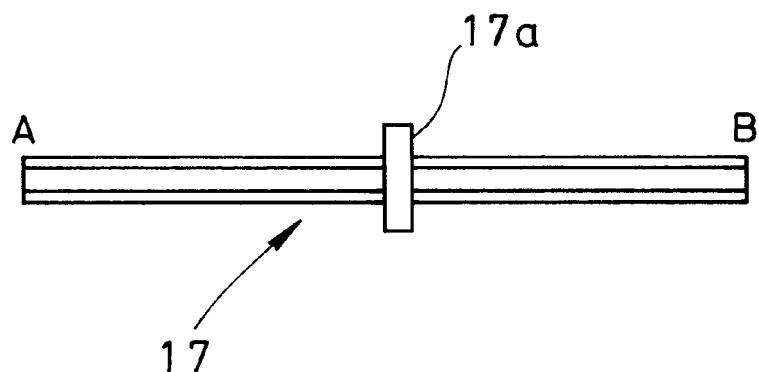
FIG. 2 shows a slide-type volume control knob used in the apparatus of FIG. 1.

FIG. 1 shows an audio signal mixer according to an embodiment of the present invention. The audio signal mixer is provided with four compact disk players (hereinafter simply called the "CD player") 1–4 which are operated in response to instructions from a microcomputer 5. Upon reproduction, the respective CD players 1–4 output audio signals as reproduced signals. An output audio signal of the CD player 1 is supplied to an input terminal of a channel (CH) 1; an output audio signal of the CD player 2 to an input terminal of CH2; an output audio signal of the CD player 3 to an input terminal of CH3; and an output audio signal of the CD player 4 to an input terminal of CH4.

Connected to the input terminal of CH1 are an input level adjuster 11, an equalizer adjuster 21, and a channel fader adjuster 31 in this order. Likewise, the input terminals of CH2, CH3, CH4 are connected to input level adjuster 12–14, equalizer adjuster 22–24, and channel fader adjuster 32–34 in this order. The input level adjusters 11–14 adjust audio signal levels respectively supplied thereto from the associated CD players in response to manipulations of an operator. The equalizer adjuster 21–24 adjust the frequency characteristics of audio signals respectively supplied thereto from the associated input level adjusters 11–14 in response to manipulations of the operator; and the channel fader adjusters 31–34 adjust audio signal levels respectively supplied thereto from the associated equalizer adjuster 21–24 in response to manipulations of the operator. The channel fader adjusters 31–34 permit fade-in and fade-out operations to be performed over a level changeable range of signals having their levels adjusted by the input level adjusters 11–14.

The outputs of the channel fader adjusters 31–34 are connected to change-over switches 61–64 for the respective channels. The change-over switches 61–64 form an associated cross-fade on/off switch 6. The change-over switch 61 selectively relays an audio signal output from the channel fader adjuster 31 to one of two terminals ON, OFF. The terminal ON is connected to A- and B-channel assign switches 7, 8. The terminal OFF in turn is connected to an adder 10. The remaining change-over switches 62–64 are also connected similar to the change-over switch 61. The channel assign switches 7, 8 each select one of the four channels CH1–CH4, and relays an audio signal of a selected channel from the output of the cross-fade on/off switch 6. The adder 10 adds audio signals of the respective selected channels output via the change-over switches 61–64 when these change-over switches 61–64 are positioned at the terminal OFF.

The output of the A-channel assign switch 7 is connected to a first voltage controlled amplifier (VCA) 15, while the output of the B-channel assign switch 8 is connected to a second VCA 16. Control terminals of the VCAs 15, 16 are connected to a slide-type volume control 17 having a knob 17a which is slidable between an A-end and a B-end, and generates two voltages VA, VB corresponding to the position of the knob 17a. More specifically, the slide-type volume control 17 is applied with a voltage Vcc which is divided to generate the two voltages VA, VB. The voltage VA presents a maximum value when the knob 17a is positioned at the A-end, while the voltage VB presents a minimum value. As the knob 17a approaches to the B-end from the A-end, the voltage VA gradually decreases while the voltage VB gradually increases. When the knob 17a is positioned at the middle point between the A-end and the B-end, the voltages VA, VB become equal to each other. Then, when the knob 17a is positioned at the B-end, the voltage VA presents a minimum value while the voltage VB presents a maximum value, contrarily to the case at the A-end.

Figure 3:
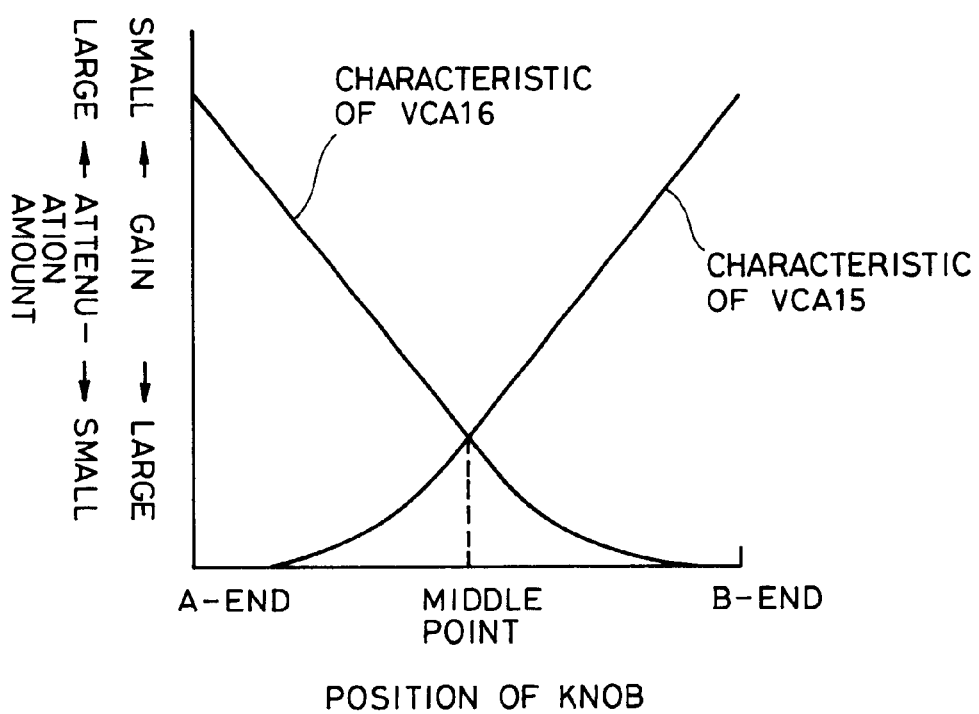
FIG. 3 is a graph showing the relationship between the position of the control knob and the gains of two VCAs.

Thus, the relationships between the gains (attenuation amounts) of the VCAs 15, 16 and the position of the knob 17a are of opposite characteristics to each other, as shown in FIG. 3. More specifically, when the knob 17a is at the A-end, the VCA 15 has the largest gain (smallest attenuation amount), while the VCA 16 has the smallest gain (largest attenuation amount). As the knob 17a is moved from the A-end to the B-end, the gain of the VCA 15 decreases, while the gain of the VCA 16 increases. With the knob 17a positioned at the middle point between the A-end and the B-end, the gains of the VCAs 15, 16 become equal. When the knob 17a is at the B-end, the VCA 15 has the smallest gain, while the VCA 16 has the largest gain.

The outputs of the VCAs 15, 16 are connected to an adder 18 such that audio signals output from the VCAs 15, 16 are added thereby. The output of the adder 18 is connected to a master fader adjuster 19. The master fader adjuster 19 is also connected to the output of the adder 10. An output signal of the master fader adjuster 19 serves as an output signal of the mixer of this embodiment. The master fader adjuster 19 permits a level adjustment or fade-in and fade-out operations to be performed over a level changeable range of audio signals supplied thereto.

In each of the channel fader adjusters 31–34, a voltage signal is generated indicative of an adjusting position which is set by the position of an associated manipulator (not shown). The respective voltage signals are digitized by associated A/D converters 91–94 and supplied to the microcomputer 5. The voltage VA output from the slide-type volume control 17 is digitized by an A/D convertor 95 and supplied to the microcomputer 5. The microcomputer 5 is further supplied with a signal indicative of an on or off state of the cross-fade on/off switch 6, and signals indicative of channels selected by the A and B channel assign switches 7, 8. A cross-fade start switch 20 for instructing cross-fade to start is also connected to the microcomputer 5.

In the mixer configured as described above, an audio signal output from either one of the CD players 1–4 is supplied to the input terminal of the corresponding channel. For example, an audio signal output from the CD player 1 functions as an audio signal of CH1 which is subjected to level adjustment in the input level adjuster 11, to adjustment of the frequency characteristic in the equalizer adjuster 21, and then to further level adjustment in the channel fader adjuster 31. Audio signals individually output from the other CD players 2–4 are processed similarly to that output from the CD player 1. When the change-over switches 61–64 are switched to the terminal OFF, an audio signal output from the channel fader adjuster 31 is supplied to the adder 10 through the change-over switch 61, and then is sent from the adder 10 to the master fader adjuster 19 where the audio signal is subjected to level adjustment and output. When audio signals are output from two of the CD players 1–4, these audio signals are added to each other in the adder 10 after passing through their associated channel fader adjusters.

On the other hand, when the change-over switches 61–64 are positioned at the terminal ON, if audio signals are output from all of the CD players 1–4, these audio signals are supplied to both the A- and B-channel assign switches 7, 8 through the change-over switches 61–62. The A- and B-channel assign switches 7, 8 allow the user to select one from the channels CH1–CH4 in each of the A- and B-channel assign switches 7, 8. For example, assuming that the channel CH1 is selected in the A channel assign switch 7 and the channel CH2 in the B channel assign switch 8, these two selected audio signals of the channels CH1 and CH2 respectively output from the CD player 1 and 2 are subjected to the cross-fade. Specifically, the audio signal level of the channel CH1 is controlled in the first VCA 15 and audio signal level of the channel CH2 is controlled in the second VCA 16 in accordance with the position of the knob 17a of the slide-type volume control 17.

Figure 4:
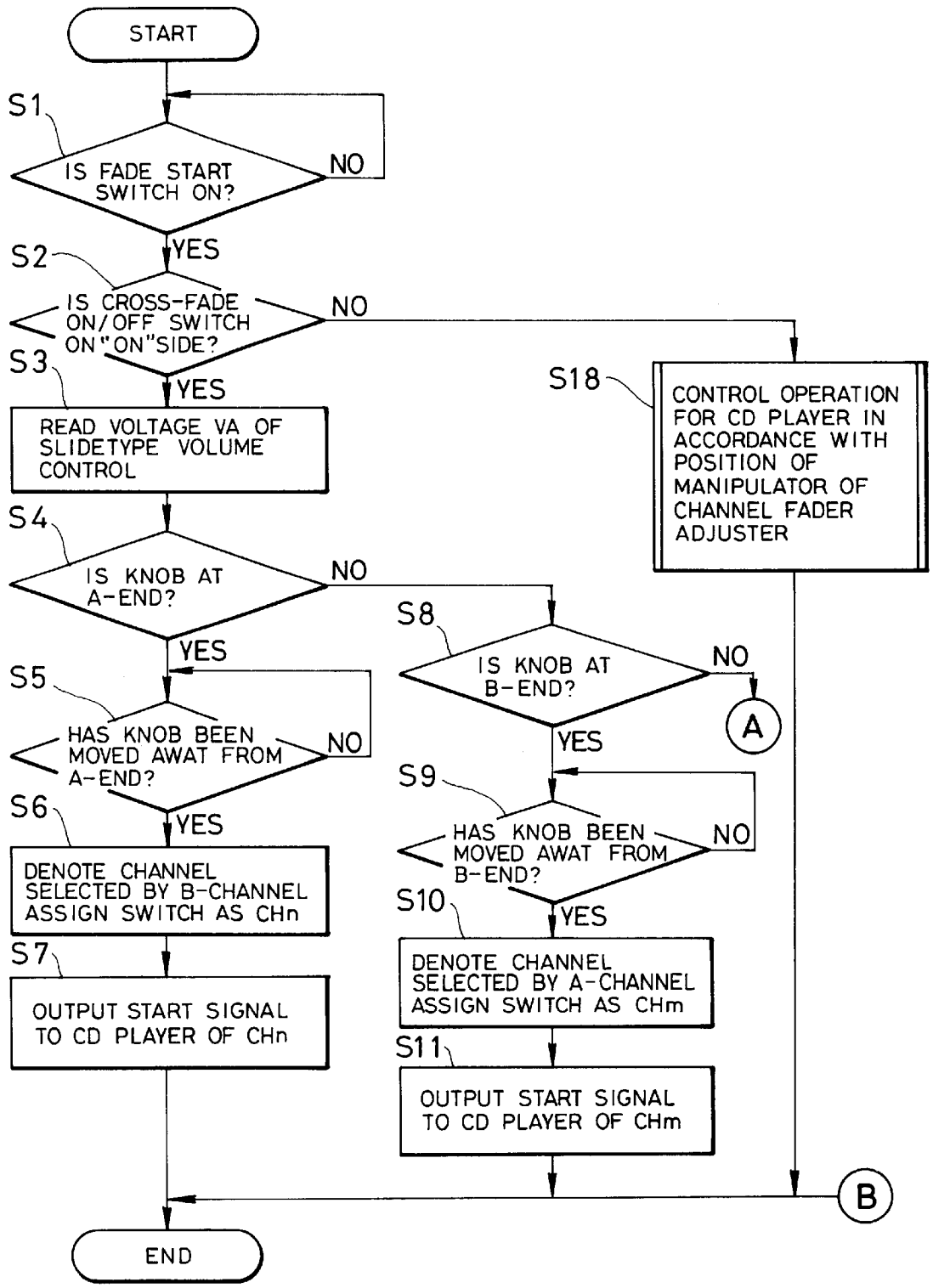
FIG. 4 is a flow chart representing an operation of a microcomputer.
Figure 5:
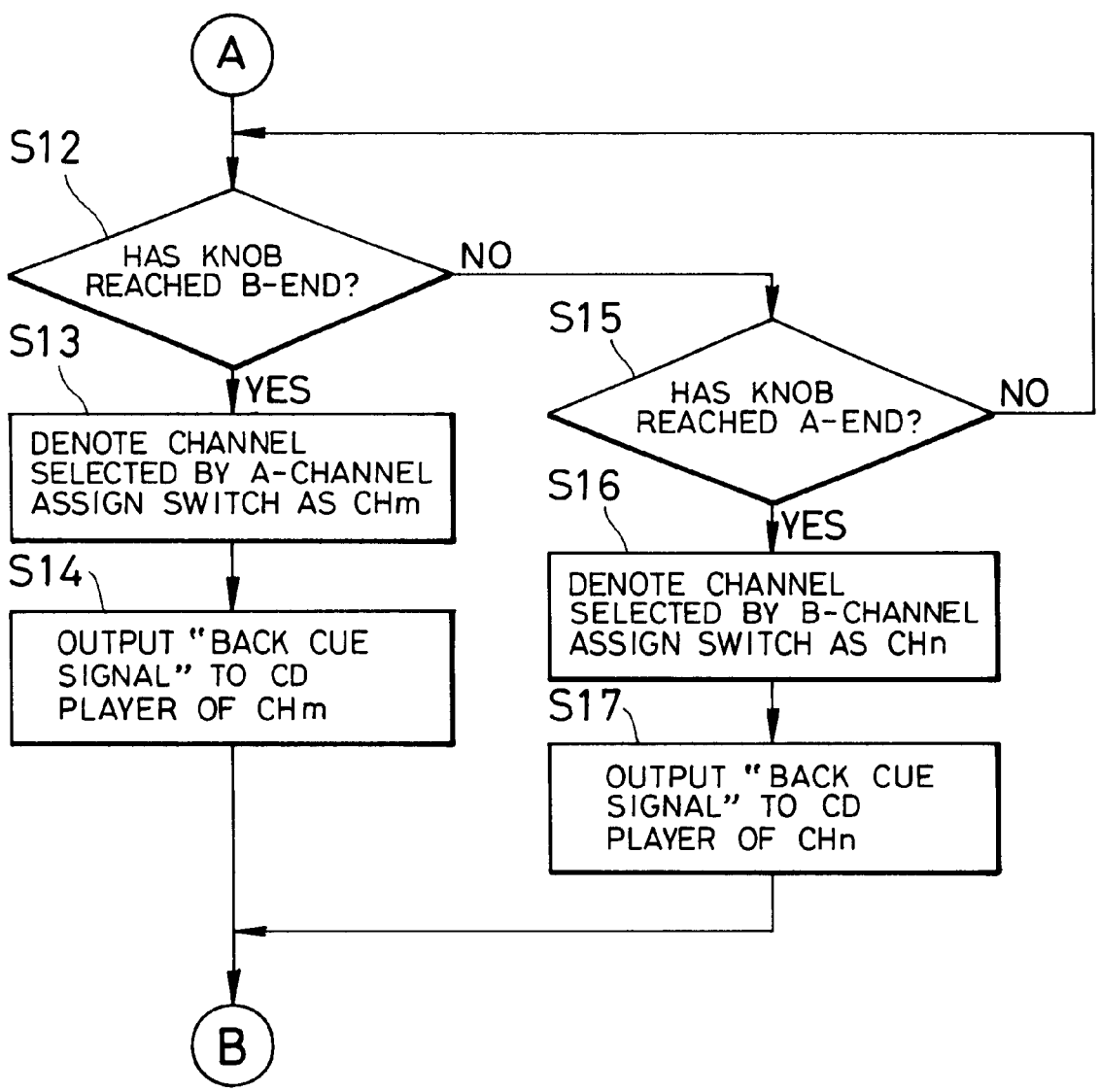
FIG. 5 is a flow chart representing an operation subsequent to that of FIG. 4.

Next, the operation of the microcomputer 5 during the cross-fade operation will be described with reference to FIGS. 4 and 5. Referring first to FIG. 4, the microcomputer 5 determines whether or not the fade start switch 20 is on (step S1). If the fade start switch 20 is on, the microprocessor 5 next determines whether or not the cross-fade on/off switch 6 is positioned on the ON side (step S2). If the cross-fade on/off switch is positioned on the ON side, the cross-fade operation can be performed, so that the microcomputer 5 reads the voltage VA indicated by the knob 17a of the slide-type volume control 17 from an output digital value of the A/D convertor 95 (step S3), and determines from the voltage VA whether or not the knob 17a is positioned at the A-end (step S4). When the knob 17a is positioned at the A-end, the microcomputer 5 determines from the digital value of the voltage VA whether or not the knob 17a has been moved from the A-end (step S5). Step S5 is repeated until the microcomputer 5 detects movement of the knob 17a from the A-end. When detecting the movement of the knob 17a from the A-end, the microcomputer 5 detects a channel selected by the B-channel assign switch 8 (step S6). Assuming herein that a selected channel detected at sep S6 is designated CHn (n is a value from one to four), the microcomputer 5 outputs a start signal to the CD player associated with the channel CHn (step S7). Thus, when the knob 17a of the slide-type volume control 17 is moved away from the A-end, a reproducing operation is started in the CD player associated with the channel CHn in response to the start signal.

If determination at step S4 is that the knob 17a of the slide-type volume control 17 is not positioned at the A-end, the microprocessor 5 determines from the voltage VA whether or not the knob 17a is positioned at the B-end (step S8). If the knob 17a is positioned at the B-end, the microcomputer 5 determines from the digital value of the voltage VA whether or not the knob 17a has been moved from the B-end (step S9). Step S9 is repeated until the microcomputer 5 detects movement of the knob 17a from the B-end. When detecting the movement of the knob 17a from the B-end, the microcomputer 5 next detects whether or not the A-channel assign switch 7 selects any channel (step S10). Assuming herein that a detected channel selected by the A-channel assign switch 7 is CHm (m is a value from one to four), the microprocessor 5 outputs a start signal to the CD player associated with the channel CHm (step S11). Thus, when the knob 17a of the slide-type volume control 17 is moved away from the B-end, a reproducing operation is started in the CD player associated with the channel CHm in response to the start signal.

If determination at step S8 is that the knob 17a of the slide-type volume control 17 is not positioned at the B-end, which means that the knob 17a is between the A-end and the B-end, the microcomputer 5 determines from the voltage VA whether or not the knob 17a has reached the B-end (step S12). If a result of the determination is that the knob 17a of the slide-type volume control 17 has been moved from the A-end and reached the B-end, the microcomputer 5 detects a channel selected by the A-channel assign switch 7 (step S13). Assuming that a selected channel is designated CHm, similarly to step S10, the microcomputer 5 outputs a back cue signal to the CD player associated with the channel CHm (step S14). Thus, when the knob 17a of the slide-type volume control 17, after moved away from the A-end, has reached the B-end, the reproducing operation by the CD player associated with the channel CHm is stopped in response to the back cue signal, and a pickup (not shown) of the CD player is returned from a currently reading position to a previously specified address position. The previously specified address position has been specified by the user (editor) and stored in a memory or the like.

At step S12, if the knob 17a of the slide-type volume control 17 has not reached the B-end, the microcomputer 5 determines from the voltage VA whether or not the knob 17a has reached the A-end (step S15). If the knob 17a has not reached the A-end, this means that the knob 17a is positioned between the A-end and the B-end, so that the flow returns to step S12. If the result of the determination is that the knob 17a of the slide-type volume control 17 has been moved from the B-end and reached the A-end, the microcomputer 5 detects a channel selected by the B-channel assign switch 8 (step S16). If the channel CHn is selected, as is the case of step S6, the microcomputer 5 outputs a back cue signal to the CD player associated with the channel CHn (step S17). Thus, when the knob 17a of the slide-type volume control 17, after moved away from the B-end, has reached the A-end, the reproducing operation of the CD player associated with the channel CHn is stopped, and a pickup (not shown) of the CD player is returned from a currently reading position to a previously specified address position.

Assuming that the A-channel assign switch 7 selects the channel CH1 and the B-channel assign switch 8 selects the channel CH2, an output audio signal from the CD player 1 associated with the channel CH1 is only output through the input level adjuster 11, equalizer adjuster 21, channel fader adjuster 31, change-over switch 61, A-channel assign switch 7, VCA 15, adder 18, and master fade adjuster 19 in this order, when the knob 17a of the slide-type volume control 17 is positioned at the A-end. In this event, the VCA 15 has the largest gain value, while the VCA 16 has the smallest gain value. When the knob 17a of the slide-type volume control 17 is moved away from the A-end, the CD player 2 is supplied with a start signal to cause the CD player 2 to output an audio signal of the channel CH2. The audio signal from the CD player 2 is supplied to the adder 18 through the input level adjuster 12, equalizer adjuster 22, channel fader adjuster 32, change-over switch 62, B-channel assign switch 8, and VCA 16, and added to the output audio signal of the CD player 1 through VCA 15 to generate a mixed audio signal which is output through the master fade adjuster 19. As the knob 17a of the slide-type volume control 17 is moved from the A-end toward the B-end, the gain of the VCA 15 gradually decreases from its largest value, while the gain of the VCA 16 gradually increases from its smallest value, whereby the audio signal level of the channel CH1 gradually decreases, while the audio signal level of the channel CH2 gradually increases.

When the knob 17a has reached the middle point between the A-end and the B-end, the gain of the VCA 15 becomes equal to that of the VCA 16, so that the audio signals of the channels CH1, CH2 are mixed at substantially the same level in the adder 18, provided that the audio signals are supplied to the VCA 15, 16 at the same level. As the knob 17a is moved from the middle point further toward the B-end, the gain of the VCA 15 further decreases while the gain of the VCA 16 further increases, resulting in the gain of the VCA 16 being higher than that of the VCA 15. Thus, in the mixing performed by the adder 18, the audio signal level of the channel CH1 becomes lower than that of the channel CH2, i.e., the channel CH2 has a higher audio signal level. When the knob 17a has reached the B-end, the VCA 15 has the smallest gain value, while the VCA 16 has the largest gain value, wherein the output audio signal of the CD player 2 associated with the channel CH2 only is outputted through the input level adjuster 12, equalizer adjuster 22, channel fader adjuster 32, change-over switch 62, B-channel assign switch 8, VCA 16, adder 18, and master fade adjuster 19 in this order. At this time, since the CD player 1 is supplied with a back cue signal, the CD player 1 stops its reproducing operation, with the pickup thereof returned from its current reading position to the previously specified address position, to enter a waiting state.

As the knob 17a of the slide-type volume control 17 is moved from the B-end toward the A-end, the operations reverse to the foregoing are performed. While the foregoing embodiment has described that the A-channel assign switch 7 selects the channel CH1 and the B-channel assign switch 8 selects the channel CH2, the operations similar to the above are performed irrespective of channels selected by the A- and B-channel assign switches 7, 8. It should be noted that one and the same channel will not be selected simultaneously by the A- and B-channel assign switches 7, 8.

Turning again to FIG. 4, at step S2, if the cross-fade on/off switch is not positioned on the ON side but on the OFF side, the operations of the CD players 1–4 are controlled in accordance with the positions of the respective manipulators of the channel fader adjusters 31–34 (step S18). For example, the microcomputer 5 generates a start signal to the CD player 1 when the manipulator of the channel fader adjuster 31, located at a MIN (minimum) position, is moved toward a MAX (maximum) position, and generates a back cue signal to the CD player 1 when the manipulator of the channel fader adjuster 31, located at any position except for the MIN position, has reached the MIN position. The microcomputer performs similar CD layer control in accordance with the manipulators of the remaining channel fader adjuster 32–34.

In the foregoing embodiment, when the knob 17a is moved from the A-end to the B-end, the CD player 1 associated with the channel CH1 is controlled to stop its reproducing operation at the time the knob 17a has reached the B-end. Alternatively, the reproducing operation of the CD player 1 associated with the channel CH1 may be stopped when the knob 17a is moved to a position closer to the B-end from the middle point between the A-end and the B-end.

Also, while the foregoing embodiment has been described in connection with CD players as apparatuses for reproducing recording signals on recording media, it is apparent that the present invention is not limited to this particular reproducing apparatus but may be applied to mixers using other reproducing apparatuses such as a tape deck, a mini-disc player, or the like.

Further, while the foregoing embodiment employs a slide-type volume control having a linearly movable knob, a rotary volume control with a rotatable knob may also be employed.

Furthermore, the slide-type volume control may be provided with a switch at each of the A-end and B-end thereof for detecting the existence of the knob at an associated end so as to control the reproducing operation of the CD player in response to an output of the switch.

In the audio signal mixer according to the present invention, a second audio signal producing means is prevented from producing a second audio signal when an operating member is positioned at a first end, while a first audio signal producing means is prevented from producing a first audio signal when the operating member is positioned at a second end. As the operating member is moved away from the first end or the second end, the first and second audio signals are mixed. As the operating member is moved toward the second end, the level of the first audio signal is gradually decreased while the level of the second audio signal is gradually increased. Conversely, as the operating member is moved toward the first end, the level of the second audio signal is gradually decreased while the level of the first audio signal is gradually increased. Thus, only by manipulating the operating member, it is possible to control two audio signal producing means such as CD players to reproduce or stop as well as to control a cross-fade operation for audio signals reproduced therefrom. In this way, the long mix editing can be carried out with simple manipulations.

What is claimed is:

1. An apparatus comprising:
    first audio signal producing means for producing a first audio signal;
    second audio signal producing means for producing a second audio signal;
    a single operating member movable between a first end and a second end;
    level adjusting means for progressively decreasing the level of said first audio signal as said operating member is positioned closer to said second end and for progressively decreasing the level of said second audio signal as said operating member is positioned closer to said first end;
    means for adding said first and second audio signals which have their levels adjusted by said level adjusting means;
    means for detecting the position of said operating member; and
    control means for controlling said first and second audio signal producing means, said control means stopping a producing operation of said second audio signal by said second audio signal producing means when said operating member is positioned at said first end and stopping the producing operation of said first audio signal by said first audio signal producing means when said operating member is positioned at said second end, said control means also restarting the producing operation of each of said first and second audio signal producing means when said operating member is moved from said second end and when said operating member is moved from said first end, respectively.

2. An apparatus according to claim 1, wherein said control means starts the producing operation of said second audio signal by said second audio signal producing means when said operating member is moved away from said first end, and starts the producing operation of said first audio signal by said first audio signal producing means when said operating member is moved away from said second end.

3. An apparatus according to claim 1, wherein said first and second audio signal producing means comprise first and second disk players, respectively, wherein said control means stops the reproducing operation of said second disk player, when said operating member has reached said first end, to set the same in a standby state with a data reading position of a pickup thereof fixed to a predetermined address position on a disk, said control means releases the standby state of said second disk player to start the reproducing operation when said operating member is moved away from said first end, said control means stops the reproducing operation of said first disk player, when said operating member has reached said second end, to set the same in a standby state with a data reading position of a pickup thereof fixed to a predetermined address position on the disk, and said control means releases the standby state of said first disk player to start the reproducing operation when said operating member is moved away from said second end.

4. An apparatus according to claim 1, wherein said control means stops the reproducing operation of said second audio signal by said second audio signal producing means when said operating member is positioned within a range from said first end to the middle point between said first end and said second end, and stops the reproducing operation of said first audio signal by said first audio signal producing means when said operating member is positioned within a range from said second end to said middle point.

* * * * *